Dec. 12, 1939.  W. C. JACKSON  2,183,321
ANTISKID DEVICE
Filed June 11, 1936  3 Sheets-Sheet 1
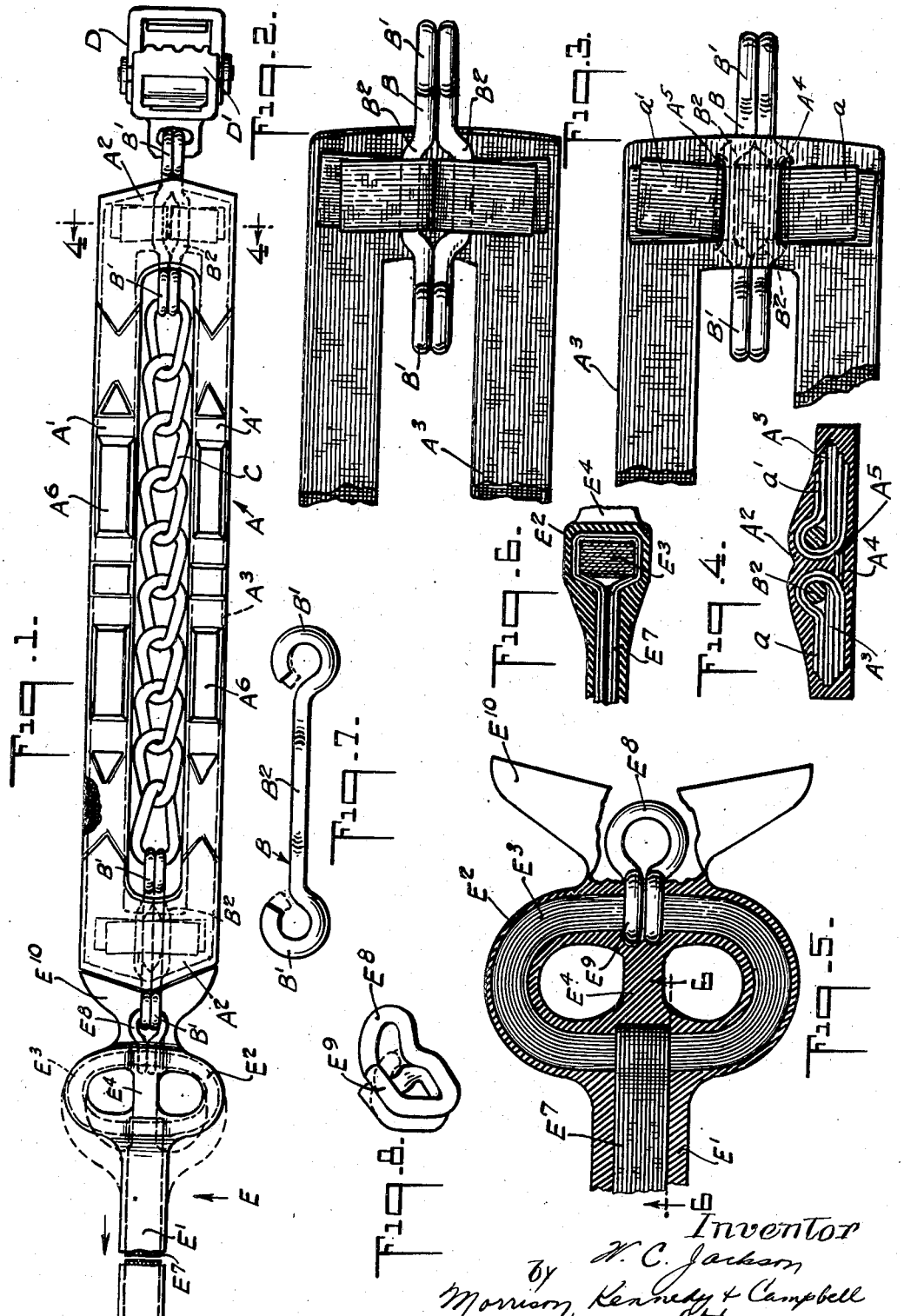

Dec. 12, 1939.  W. C. JACKSON  2,183,321
ANTISKID DEVICE
Filed June 11, 1936   3 Sheets-Sheet 2
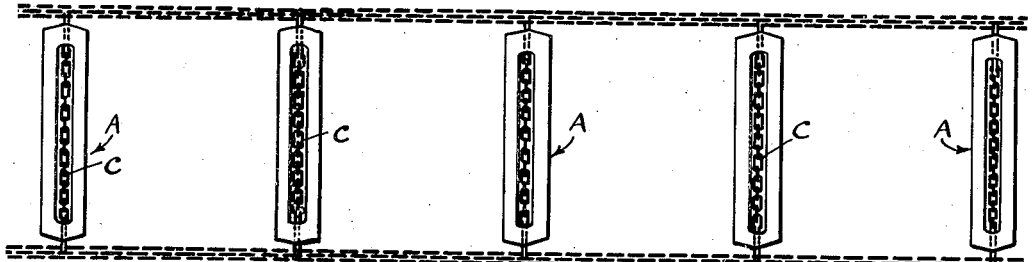
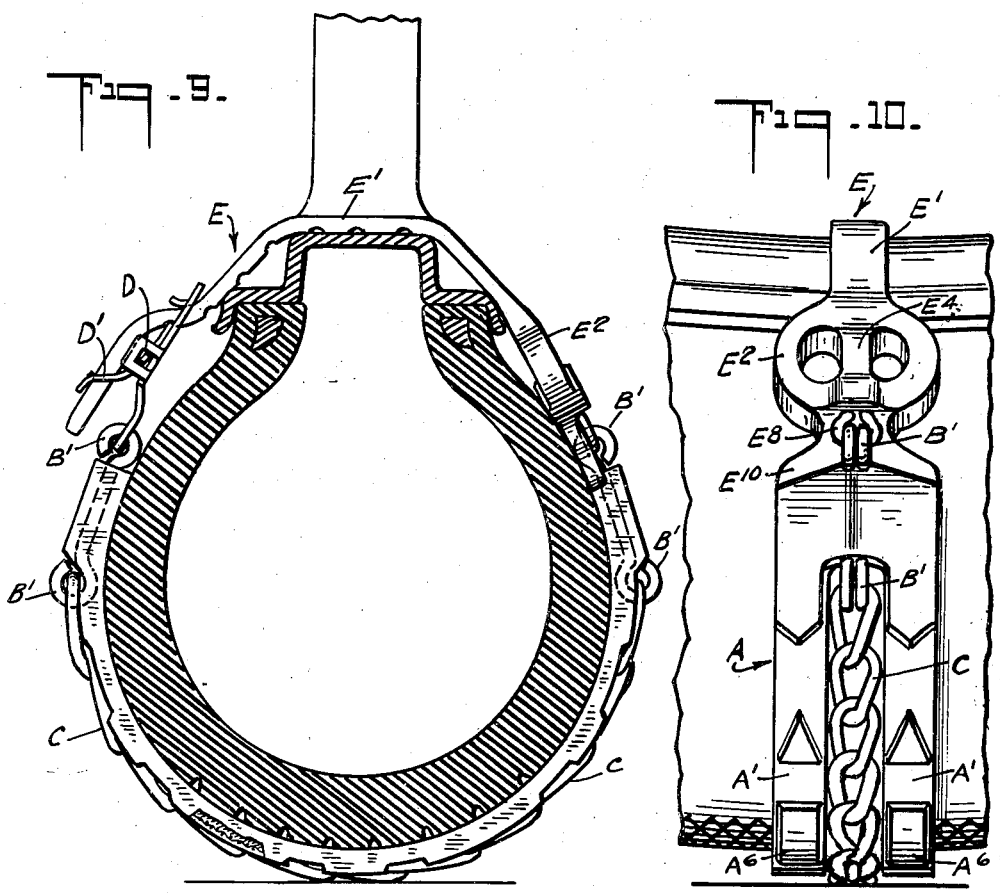
BY W. C. Jackson
Morrison, Kennedy & Campbell
ATTORNEYS Patented Dec. 12, 1939

2,183,321

UNITED STATES PATENT OFFICE 2,183,321

ANTISKID DEVICE

Walter C. Jackson, Rahway, N. J., assignor to Tingley Reliance Rubber Corporation, a corporation of New Jersey Application June 11, 1936, Serial No. 84,625

3 Claims. (Cl. 152—222)

This invention relates to antiskid devices for use with automobile tires, and more particularly to those that are adapted for quick attachability in an emergency.

In the embodiment of the invention herein disclosed, there is provided as usual a short section of chain arranged to be strapped to the tire and to provide a gripping action under road conditions where the usual nonskid surface of the tire has little or no effect. According to the present improvements, the section of the chain is flanked on each side by a cushioning strip, both strips being joined together at their ends by transverse end sections in which there are embedded links to which the section of chain is connected at its opposite ends. The cushioning strips, as well as the end sections, are molded of rubber as an integral member and reinforced by plies of square woven fabric, in order to minimize stretching in these parts as much as possible. Furthermore, the cushioning strips in their road contacting surfaces are formed with non-skid protrusions which assist the chain in its antiskid activity.

The links to which the section of chain is connected are, at their opposite ends, connected one to a buckle and the other to a holding strap which goes around the felly of the wheel and cooperates with the buckle in holding the antiskid device in place on the tire. According to this construction, all the tension exerted in pulling up on the strap is transmitted directly to the chain and not to the cushioning strips, since, as will be recalled, the strips are connected to the end links solely by virtue of the fact that the latter are embedded in the transverse sections that connect the cushioning strips together.

The holding strap has a certain amount of resiliency or elasticity, in order that the antiskid device may be pulled up tightly in contact with the tire and yet yield sufficiently to conform to changes in tire contour, as well as absorb the shock incident to the chain striking the road during service. In order to obtain a sufficient degree of elasticity or resiliency without detracting from the strength of the strap, which incidentally is made of molded rubber in the preferred embodiment, there is provided a loop which will deform under load and return immediately to its original form when the load is removed. Durability in the strap and the loop is provided by reinforcing these members with plies of fabric molded into the rubber during manufacture.

Referring to the drawings:

Fig. 1 is a plan view of an antiskid device and a holding strap embodying the present improvements;

Fig. 2 is a detail view of a portion of the reinforcing fabric entering into the construction of the cushioning strips, and showing the manner in which the end links are secured thereto;

Fig. 3 is a view similar to Fig. 2, looking at the parts however from the reverse side;

Fig. 4 is a vertical sectional view on line 4—4 of Fig. 1;

Fig. 5 is a horizontal sectional view through a portion of the holding strap;

Fig. 6 is a vertical sectional view on line 6—6 of Fig. 5;

Fig. 7 is a detail view of one of the link members by which the section of chain is connected to the strap;

Fig. 8 is a perspective view of an eye member associated with the strap and by which the strap is connected to an end link of the antiskid device;

Fig. 9 is a sectional view through a tire and the felly of its associated wheel, and showing the manner in which the antiskid device is attached to the wheel in service;

Fig. 10 is a side view of a portion of a tire and wheel and likewise showing the antiskid device attached to the wheel in service;

Fig. 11 is a diagrammatic view, illustrating the non-skid elements as cross links in a non-skid chain.

Figure 12:
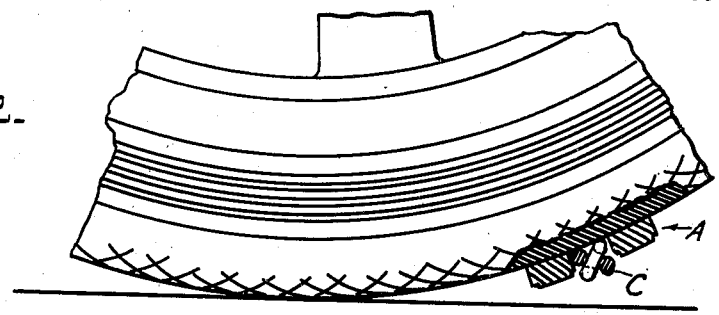
Figs. 12 to 14 are side views of a portion of a tire and wheel, showing an antiskid device in cross section, and illustrating the manner in which the device performs in service.

As shown in Fig. 1, there is provided an antiskid device A which includes a pair of spaced parallel cushioning strips $A^1$ and a pair of transverse end sections $A^2$ connecting the strips together to form an integral unit. The device is formed of molded rubber reinforced by a plurality of plies $A^3$ of cross woven fabric and has embedded in each of its end sections $A^2$, a link B extending longitudinally therethrough and formed at its opposite ends with eyes $B^1$, which protrude beyond the edges of the end sections. The eyes at the inner ends of the links B are connected to the opposite ends of a section of antiskid chain C, which consequently lies between the cushioning strips $A^1$, while the eyes at the outer ends of the links are connected one to a buckle D and the other to a holding strap E.

The links B (see Figs. 2, 3 and 4), in addition to being embedded in the rubber of the end sections $A^2$, are firmly anchored to the reinforcing plies $A^3$. Actually, the links B are of double construction, the end portions thereof which present the eyes $B^1$ being in contact or at least closely spaced, whereas the center portions $B^2$ belly outwardly to allow space for two pairs of strips of fabric $a$ and $a^1$ to pass through, one pair of strips $a$ passing along the top of the main plies $A^3$ from a point near the lateral edge thereof, around the central portion $B^2$ of one half of the duplicate link, through a slit $A^4$ in the main fabric and then outwardly along the bottom of the fabric to a point likewise near the lateral edge thereof, while the other pair of strips $a^1$ extends in like manner from the opposite edge of the plies $A^3$ around the other central portion $B^2$ of the link and through a similar slit $A^5$ in the main plies (Figs. 2, 3 and 4). As the main plies of fabric $A^3$, as well as the strips $a$ and $a^1$ are frictioned with rubber and then covered with strips of rubber and vulcanized, it is obvious that the links B will be firmly held in place in the transverse end sections $A^2$.

Initially, the eyes $B^1$ at the opposite ends of the links B (see Fig. 7) are slightly open, as shown in solid lines, to facilitate the connection thereto of the chain section and the strap and buckle, but after these members have been connected to the eyes, the latter are bent to the position shown in dotted lines to secure the parts firmly together. Preferably, the ground contacting surfaces of the cushioning strips $A^1$ are formed with non-skid protrusions $A^6$, which will materially assist the action of the chain C in service, as will be more fully described hereinafter.

The strap E, which passes around the felly of the wheel, for securing the antiskid device in place, is formed with a straight portion $E^1$ for cooperating with the buckle D and a looped portion $E^2$ which deforms under load but returns instantly to its original form when the load is removed, thus providing a sufficient degree of elasticity or resiliency to conform with changes in tire cross section, as well as to absorb the shock resulting from the continuous pounding of the chain on the road, although with the present improvements this pounding is not nearly so great as with the antiskid devices in common usage.

The loop $E^2$ and strap $E^1$ are formed of molded rubber and as an integral member. In the embodiment illustrated, the loop $E^2$ is reinforced by a strip of fabric wound spirally to form a plurality of plies $E^3$ and, if desired, the rubber may be extended across the loop, as at $E^4$, in the direction of pull, in order to give additional strength and elasticity at this point, although this is not actually necessary, since the tendency of the molded loop itself to return to its original unstressed shape will provide a sufficient degree of elasticity for all practical purposes.

The straight portion $E^1$ of the strap is likewise reinforced throughout its length by a series of plies of fabric $E^7$ which are looped around the plies $E^3$ of which the loop $E^2$ is composed (see Figs. 5 and 6). Here, again, the fabric in the loop, as well as in the straight portion of the strap, is frictioned before vulcanization, and it will be noted that the layer of rubber between the two inner plies in the straight portion of the strap is relatively thick to obviate any tendency of the plies to separate in this region.

In order to connect the holding strap E to the link B at the end of the antiskid device, there is provided an eye $E^8$ protruding from the loop $E^2$ diametrically opposite the straight portion $E^1$ and which is securely connected to the loop by portions $E^9$ which are bent around the plies $E^3$ therein before the application of the outside layer of rubber and its subsequent vulcanization. This eye is illustrated in detail in Fig. 8, the shape of the ends before bending in place being shown in solid lines, and the final shape of the ends after having been placed around the plies $E^3$ being shown in dotted lines. As an expediency to protect the tire from the metal eye $E^8$, the strap may be molded with a flat portion of rubber $E^{10}$ extending beneath the eye and which in service will be located between the eye and the tire. This flat portion will also assist in preventing the eye $E^8$ from working loose by rotation around the plies $E^3$.

The fabric which forms part of the strap, both in the straight portion, as well as in the loop portion thereof, is the usual cord fabric ordinarily used in tire manufacture. There are comparatively few pick threads per inch in this fabric and the warp cords are arranged lengthwise of the strips. This construction will permit the straight portion of the strap to be thoroughly flexible and thus facilitate its application. Although the loop $E^2$, as shown, is oval in shape, this is merely an expedient due to lack of room near the felly of the wheel. Actually, the loop would perform its function in the same manner if it were round or of any other suitable configuration.

In applying the anti-skid device to the wheel, the strap is passed around the felly of the wheel and through the buckle, whereupon it is pulled up tight until the cushioning strip members $A^1$ are in close contact with the surface of the tire (see Figs. 9 and 10). The buckle is provided with a hinged member $D^1$, one edge of which will cooperate with one or another of a plurality of notches $e$ formed in the felly contacting surface of the strap, and thus the device will be held firmly on the wheel without slippage. In this connection, it will be noted that the radius of curvature of the tire contacting surfaces of the cushioning strip members is somewhat smaller than the radius of curvature of the longitudinal center line of the chain C and, in manufacturing the device, the parts are properly proportioned with this consideration in mind.

Figure 13:
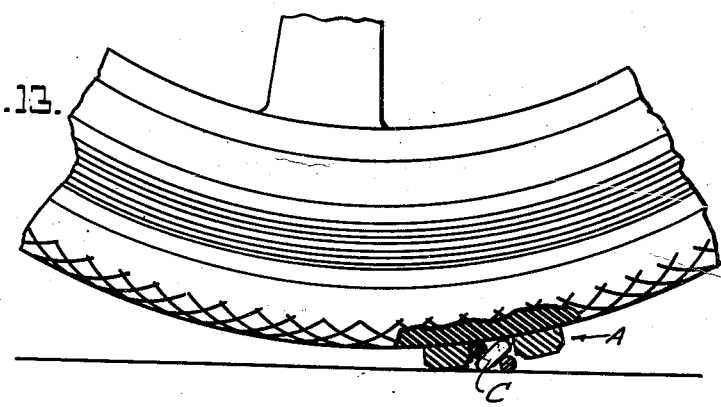
Figure 14:
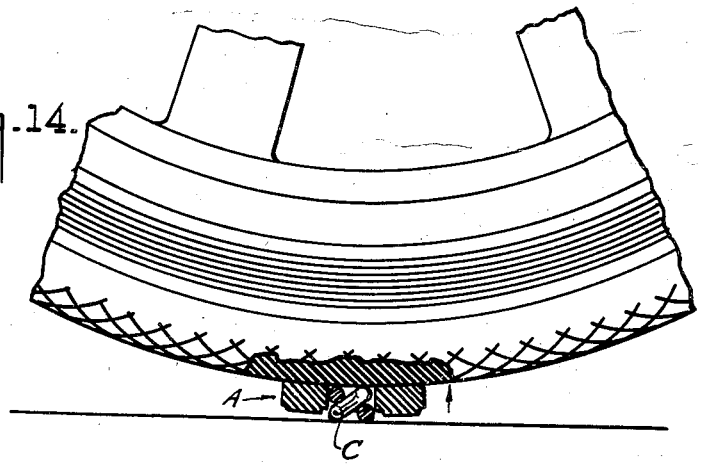

An emergency chain of this character finds its chief utility in winter driving when snow is on the ground, particularly in preventing spinning of the wheels when starting. In urban sections, it is the usual practice to scrape the center of the road and to pile the snow at the sides. As it is necessary to park vehicles at the sides of the street, usual conditions require starting in relatively deep snow and running in a section of the street comparatively free of snow. Starting conditions require the use of chains to prevent the wheels from spinning, whereas for running conditions, it would be better if no chains were employed at all, since, under these conditions, the chains are rapidly worn and the riding is bumpy. With the present invention, all of the virtues of the chain for starting are present, since the chain protrudes beyond the non-skid portions of the strips and, in addition, these latter portions provide further non-skid surface, which is helpful. When the road is comparatively free of snow, wear on the chain is substantially eliminated and the riding of the car rendered substantially smoother, since the cushioning strips permit the wheels to ride up gradually to the outer surface of the chain, and then gradually off the chain. These conditions are illustrated in Figs. 12 to 14;

Fig. 12 showing the approach of the emergency chain into contact with the road, Fig. 13, the riding of the wheel gradually up on to the chain, and Fig. 14, the chain in contact with the road where its non-skid virtues are present if required.

If desired, the chain and cushioning strip members could be employed as the cross links of the conventional skid chain, which extends entirely around the tire, the use of the devices A in this connection being illustrated diagrammatically in Fig. 11.

When thus used, the side chain elements would be connected directly to the outer ends of the links B, which are embedded in the end sections of the strip member.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. An antiskid device for use with an automobile tire, comprising a section of chain with terminal connecting links at opposite ends thereof, and a cushioning unit anchored to said terminal links, said cushioning unit including lateral cushioning strips arranged in parallel relation at opposite sides of the chain and yieldable end portions connecting said cushioning strips together.

2. An antiskid device according to claim 1, wherein the cushioning strips and end portions are formed of fabric molded in rubber, and wherein the fabric is continuous throughout said cushioning strips and end portions.

3. An antiskid device according to claim 1, wherein the end portions are formed of fabric molded in rubber, and wherein the terminal connecting links are embedded in said end portions and held in place by loops of fabric passing therearound and through the fabric in said end portions, the fabric loops likewise being molded in said end portions.

WALTER C. JACKSON.